(12) United States Patent
Garg et al.

(10) Patent No.: US 8,122,011 B1
(45) Date of Patent: Feb. 21, 2012

(54) IDENTIFYING SIBLING QUERIES

(75) Inventors: Ashutosh Garg, Sunnyvale, CA (US);
Kedar Dhamdhere, Sunnyvale, CA (US)

(73) Assignee: Google Inc., Mountain View, CA (US)

( * ) Notice: Subject to any disclaimer, the term of this patent is extended or adjusted under 35 U.S.C. 154(b) by 325 days.

(21) Appl. No.: 12/402,686

(22) Filed: Mar. 12, 2009

Related U.S. Application Data

(60) Provisional application No. 61/036,060, filed on Mar. 12, 2008.

(51) Int. Cl.
*G06F 7/00* (2006.01)
(52) U.S. Cl. ........................................ 707/721; 707/767
(58) Field of Classification Search .................. 707/759, 707/758, 763, 765, 766, 767, 706.708, 721
See application file for complete search history.

(56) References Cited

U.S. PATENT DOCUMENTS

| | | | |
|---|---|---|---|
| 2006/0253427 A1* | 11/2006 | Wu et al. | 707/3 |
| 2008/0319975 A1* | 12/2008 | Morris et al. | 707/5 |
| 2009/0193047 A1* | 7/2009 | Chen et al. | 707/102 |

* cited by examiner

*Primary Examiner* — Amy Ng
(74) *Attorney, Agent, or Firm* — Fish & Richardson P.C.

(57) ABSTRACT

Methods, systems, and apparatus, including computer program products, in which one or more search query suggestions can be identified based upon the intersection of predicate search groups. A first predicate search group can be compared to a second predicate search group to derive a query map value associated with the intersection of the predicate search groups. The query map value can be compared to a threshold to determine whether to identify different search queries as suggestions for one another.

17 Claims, 5 Drawing Sheets

$Q_{01}$ and $Q_{02}$ are siblings $Q_{01}$ and $Q_{02}$ are not siblings

IDENTIFYING SIBLING QUERIES

CROSS-REFERENCE TO RELATED APPLICATIONS

This application claims priority under 35 U.S.C. §119(e) to U.S. Provisional Application Ser. No. 61/036,060, titled "IDENTIFYING SIBLING QUERIES" filed Mar. 12, 2008, the disclosure of which is incorporated herein by reference in its entirety.

BACKGROUND

This disclosure relates to providing query suggestions.

A search engine can allow a user to provide a search query for which search results are returned in response. Some search engines can provide suggestions to the user based upon the search query the user entered. For example, some search engines provide search query suggestions based upon the current search query and previous queries that are stored in query logs. However, some search engines may not be able to provide adequate suggestions for search queries that are used infrequently. Additionally, some search engines may suggest search queries that can lead to topic drift.

SUMMARY

This specification describes technologies by which query logs can be analyzed to identify query suggestions.

In general, one aspect of the subject matter described in this specification can be embodied in methods that include the actions of identifying a first query and a second query in a query log, each of the first and second queries being immediate subsequent queries to a group of overlapping predicate queries; determining a query map value associated with the group of overlapping predicate queries; determining if the query map value exceeds a threshold; and if the query map value exceeds the threshold, identifying the first query as a suggestion for the second query and the second query as a suggestion for the first search query. Other embodiments of this aspect include corresponding systems, apparatus, and computer program products.

In general, another aspect of the subject matter described in this specification can be embodied in methods that include the actions of identifying a first group of predicate queries that have preceded a first query; identifying a second group of predicate queries that have preceded a second query; identifying intersecting predicate queries between the first group of predicate queries and the second group of predicate queries; comparing a count of the intersecting predicate queries to a sum of the first group of predicate queries and the second group of predicate queries to produce a query intersect frequency; determining whether the query intersect frequency exceeds a threshold query intersect frequency; and identifying the first query and second query as suggestions for one another if the query intersect frequency exceeds the threshold query intersect frequency. Other embodiments of this aspect include corresponding systems, apparatus, and computer program products.

Particular implementations of the subject matter described in this specification can be implemented so as to realize one or more of the following advantages. One advantage of the disclosure is minimization of topic drift for search query suggestions. Another advantage of the disclosure is the identification of query suggestions for infrequently used queries. These advantages can be separately realized or realized in combination in various implementations.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
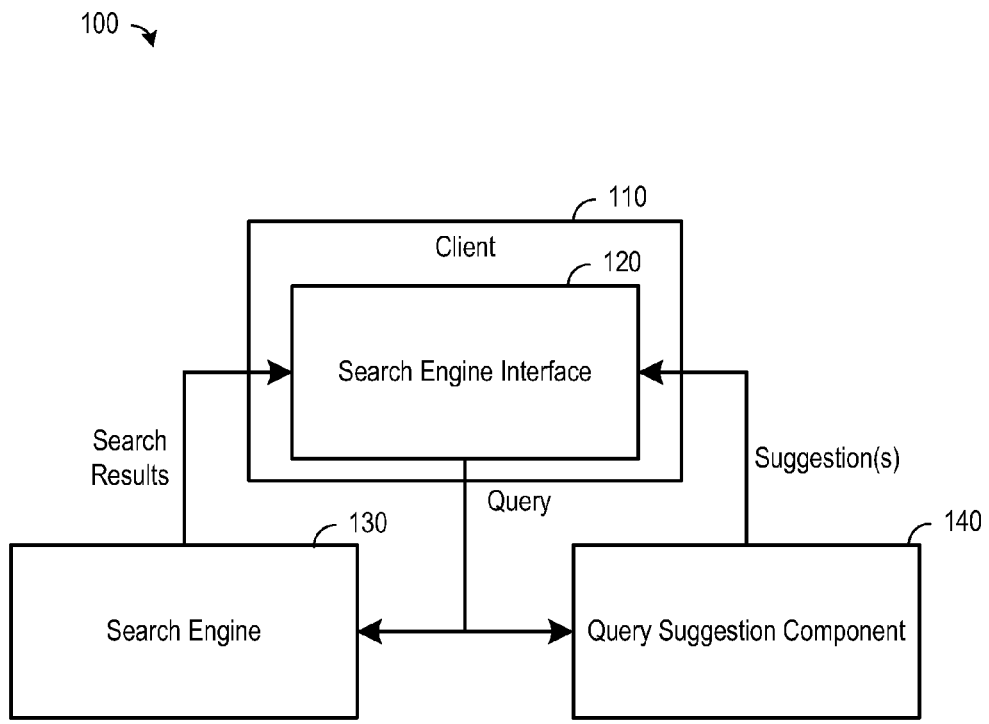
FIG. 1 is a block diagram illustrating an example suggestion system.

FIG. 1 is a block diagram illustrating an example suggestion system. The suggestion system 100 can receive input from a client 110. In some implementations, the suggestion system includes a search engine interface 120, a search engine 130 and a suggestion component 140. The search engine interface 120 can implemented as a set of web pages through which a user interacts with the system 100, including a web page distributed to and displayed by the client (e.g., a browser) that enables the user using the client to input and submit a search query.

The search engine interface 120 can distribute the received search query to a search engine 130 and a suggestion component 140. In some implementations, the suggestion component 140 can be part of the search engine. In other implementations, the suggestion component 140 can be provided by a third party. For example, a third party application can be integrated into the system by a plug-in component to the interface 120 located on the client 110. In this example, the plug-in component can communicate the query to the suggestion component 140 provided by a third party.

In some implementations, the search engine 130 can derive relevance scores associated with the most relevant pages based on the search query. In further implementations, the search engine 130 can derive ranking scores associated with the quality of a web page as measured by the number of other sites linking to a page. The search engine 130 can also derive a score (e.g., an information retrieval (IR) score) related to the search results. In some implementations, IR scores can be computed from, for example, dot products of feature vectors corresponding to a query and a document relevance, ranking scores, and/or combinations of IR scores and ranking scores, etc. Other search engines can also be implemented.

The query suggestion component 140 can receive a search query from the search interface 120 and provide a suggested search query back to the search interface 120. In some implementations, the query suggestion component 140 can provide the suggested search query based upon identifying sibling queries. In some implementations, sibling queries are those queries that have a determined degree of similarity between their respective sets of predicate queries. A predicate query is a query that immediately precedes another query (e.g., a potential sibling query). For example, a user might enter the query "Texas" and the very next query the user might enter is "Armadillo." Thus, in this example, "Texas" is a predicate query to "Armadillo." In some implementations, when two queries have been identified as sibling queries, when one sibling has been submitted as a query, the other sibling can be provided as a suggestion.

In some implementations, the suggestion component 140 can provide a multiple suggestions to the user based upon a received search query and sibling queries associated with the received search query. Sibling queries can be identified when two or more search queries result from respective sets of predicate queries that immediately precede the respective search queries and contain some degree of commonality (e.g., a query map value). Selection of sibling query suggestions having a degree of commonality between the respective sets of predicate queries can reduce topic drift (e.g., gradual migration of a search session to a different topic). For example, if an intersection (e.g., overlap) between a first set of predicate queries associated with a first query and a second set of predicate queries associated with a second query is large enough, the first and second queries can be identified as suggestions for each other.

In some implementations, when multiple sibling queries are provided, those sibling queries can be provided in a ranked order. The sibling query suggestions can be ranked, for example, based upon the popularity of the respective sibling queries. In other examples, the sibling queries can be ranked based upon a degree of commonality (e.g., as defined by a query map value) to the received query.

The one or more sibling search queries identified by the query suggestion component 140 can be provided to the search engine interface 120. For example, if the query suggestion component 140 identifies a first suggested search query and a second suggested search query, the query suggestion component 140 can provide the first and second suggested search queries to the search interface 120.

In some implementations, the search interface can receive the search results for a current search query from the search engine 130 and the suggested search query(ies) from the query suggestion component 140. The search engine interface 120 can provide the search results and the suggested search query(ies) to the client 110. In some implementations, the search engine interface 120 can combine the search results and the suggested search query(ies) together, and can provide the combination to the client 110. For example, the search engine interface 120 can generate a web page using the search results received from the search engine 130 and the suggested query(ies) received from the query suggestion component 140. The search engine interface 120 can communicate the generated web page to the user for viewing.

In some implementations, the suggested query(ies) can be generated as links such that a user can select one of the links through the client using the search engine interface, and a request to perform the search associated with the selected suggested search query can be communicated to the search engine interface. In further implementations, the search results can be linked to the respective web pages that they describe.

In some implementations, upon the completion of a current search session, the current search session can be stored to a query log for use in deriving future search query suggestions.

The search engine 130 and the query suggestion component 140 can be realized by instructions that upon execution cause one or more processing devices to carry out the processes and functions described above. Such instructions can, for example, comprise interpreted instructions, such as script instructions, e.g., JavaScript or ECMAScript instructions, or executable code, or other instructions stored in a computer readable medium. The search engine 130 and the query suggestion component 140 can be implemented separately, or can be implemented as a single software entity. The search engine 130 and the query suggestion component 140 can also be distributively implemented over a network, such as a server farm, or can be implemented in a single computer device.

Figure 2A:
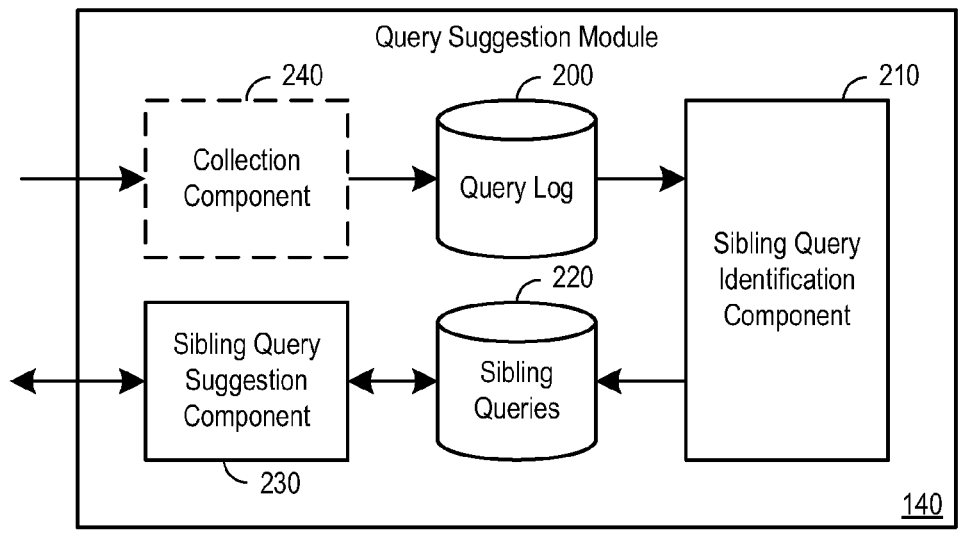
FIG. 2A is a block diagram illustrating an example of a query suggestion component including a sibling query suggestion component.

FIG. 2A is a block diagram illustrating an example of a query suggestion component 140 including a sibling query suggestion component. In some implementations, the query suggestion component 140 can include a query log 200, a sibling query suggestion component 210, a sibling query store 220, and a sibling query suggestion component 230. In further implementations, the query suggestion component can include an optional collection component 240 operable to collect queries to store to the query log 200.

The query log 200 can include queries collected from completed searches (e.g., those searches that have been completed prior to receipt of a current search query). In some examples, the query log can be received from an external collection component or from the search engine. In other examples, the query log can be generated based upon each of the queries received by the suggestion component 140.

In some implementations, the queries in a query log 200 can be grouped by session. A search session can be defined by a period of time between queries. For example, if a particular client enters a query, a current search session can be initiated. The current search session can be terminated when the search engine has not received further queries from the user for a preset period of time (e.g., 5-10 minutes). In other implementations, the search session can be defined by a user indicating the beginning and end of a search session (e.g., by logging into a search engine interface and logging out of a search engine interface).

In still further implementations, the search session can be defined by a relationship between a newly received search query and previously received search queries from the same user. In some examples, a relationship can be identified based upon a current search query including a search term that also appears in a previous search query from the same user. In another example, a relationship can be identified based upon the same pages being included in previous search results.

In other implementations, any of the foregoing techniques can be combined to identify whether a new query belongs to a previous session.

Figure 2B:
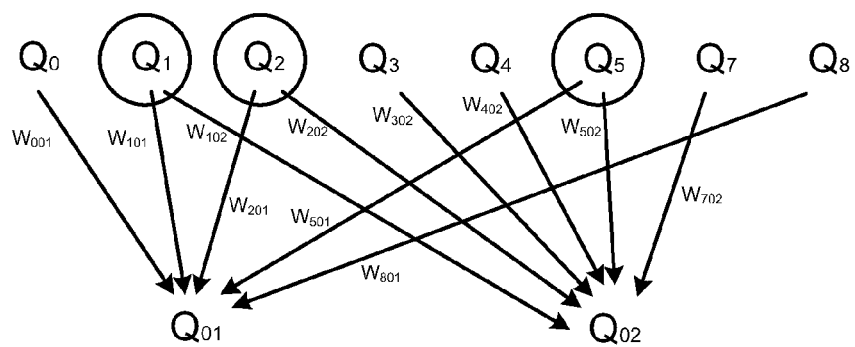
FIG. 2B is a link diagram illustrating an example relationship between follow-up queries and predicate queries.

The sibling query identification component 210 can analyze the query log 200 to identify sibling queries. In some implementations, sibling search queries can be identified by mining the query log 200. The query log 200 can include information about previous search queries received by a search engine. A sibling query can be identified by analyzing groups of predicate queries associated with each of the queries in the query log 200. Groups of predicate queries can be identified by locating the set of queries that immediately precede each search term and including those queries into a predicate query set. The groups of predicate queries can be compared to each other identify a degree of commonality between one group of predicate queries and another group (or groups) of predicate queries. For example, as depicted in FIG. 2B, where a first search query Q01 is associated with a predicate query set including {Q0, Q1, Q2, Q5, Q8} while a second query Q02 is associated with a predicate query set {Q1, Q2, Q3, Q4, Q5, Q7}, the intersection of these predicate query sets include three overlapping predicate queries {Q1, Q2, Q5} (circled queries in FIG. 2B).

The sibling query identification component 210 can derive a query map value that can be used to describe a degree of overlap between groups of predicate queries. In some implementations, the query map value can include a query quantity. The query quantity defines the total number (e.g., quantity) of intersecting predicate queries. With respect to the example of FIG. 2B, the query map value, based upon the total number of intersecting predicate queries, can be three (e.g., {Q1, Q2, Q5}).

In other implementations, the query map value can include a query intersect frequency. The query intersect frequency defines a percentage with which the groups of predicate queries intersect in relation to the union of the groups of predicate set (e.g., the entire set of predicate queries for the identified queries). With respect to the example of FIG. 2B, the query intersect frequency could be 3/8, because three intersecting predicate queries (e.g., {Q0, Q1, Q2, Q5, Q8}∩{Q1, Q2, Q3, Q4, Q5, Q7}={Q1, Q2, Q5}) of the eight total predicate search queries (e.g., the union of the first and second predicate query sets; {Q0, Q1, Q2, Q5, Q8}∪{Q1, Q2, Q3, Q4, Q5, Q7}={Q0, Q1, Q2, Q3, Q4, Q5, Q7, Q8}) overlap. Thus, the query intersect frequency can identify an intersect set size over a union set size.

In some implementations, the sibling query identification component 210 can filter the sets of predicate queries such that inclusion into a set of predicate queries for determination of the query map value requires a threshold association between the predicate queries and the sibling queries. For example, if a predicate query is only immediately followed-up with a potential sibling query by a single user, the predicate query might not be very related to the sibling query. Thus, the sibling query identification component 210 can apply a threshold query weight to the relationship between the sibling queries and their respective predicate queries to identify an adjusted set of predicate queries for each potential sibling query. For example, in FIG. 2B, Q0 and Q01 are connected by a query weight Q001. The query weight can be defined by the frequency with which Q0 is followed by Q01. For example, if 20% of the time when Q0 is received, it is followed by Q01, then W001 would be 0.2 (20/100). The adjusted set of predicate queries, instead of the complete set of predicate queries, can be used by the sibling query identification module 210 in determining the query map value.

Optionally, the sibling query identification component 210 can filter popular queries (e.g., queries received more than a threshold number of times) from sibling query sets in implementations in which popular queries already have been associated with query suggestions without identifying sibling queries.

In some implementations, after the sibling query identification component 210 has identified a set of sibling queries, information identifying the sibling queries can be stored to a sibling queries data store 220. The sibling queries data store 220 can include information identifying sets of queries identified as siblings to each other. For example, if queries Q01 and Q02 have been identified as sibling queries, information identifying the set {Q01, Q02} can be stored to the sibling query data store 220.

The sibling query suggestion component 230 can receive new queries and determine whether the new queries have any siblings. The new queries can be received from a search engine interface (e.g., search engine interface 120 of FIG. 1). In some implementations, the sibling query suggestion component 230 can determine whether the new queries have any siblings by searching the sibling query data store 220. For example, if the query Q02 is received, the sibling query suggestion component 230 can search the sibling query data store 220 to determine whether Q02 is present in any of the sibling query sets. In the example of FIG. 2B, Q02 is present in the sibling query set {Q01, Q02}. Thus, in this example, Q01 is a sibling query to Q02, and can be provided to an interface (e.g., search engine interface 120 of FIG. 1) for presentation to a user or agent.

In various instances, a query might be present in multiple sibling query sets. In some implementations, when the sibling query suggestion component receives a query that is present in multiple sibling query sets, both sibling query sets can be provided to an interface for presentation to a user or agent. In other implementations, when the sibling query suggestion component receives a query that is present in multiple sibling query sets, the sibling query suggestion component can analyze the multiple sibling query sets to determine which of the multiple sibling query sets is most relevant to the received query. For example, if the received query is Q02 and a first sibling query set comprises {Q01, Q02} (as in the example of FIG. 2B), while a second sibling query set comprises {Q02, Q03, Q06, Q08}, the first and second sibling query sets are compared to determine whether Q02 has more predicate queries in common with the first set of sibling queries or the second set of sibling queries. For example, a query weighting for the sibling queries in the sibling query set can be used to determine whether one sibling query set is more related to Q02 than the other sibling query set. In another example, the query map value associated with the sibling queries in the respective sibling query sets determines which query set is suggested. In further implementations, both sets of sibling queries can be provided for presentation to the user and, optionally, a notation can be made to provide the user or agent with information about which sibling query set is believed to be more related to the received search query. Alternatively, some of each set can be provided, in order of their respective popularity or some measure of relevance.

Figure 3:
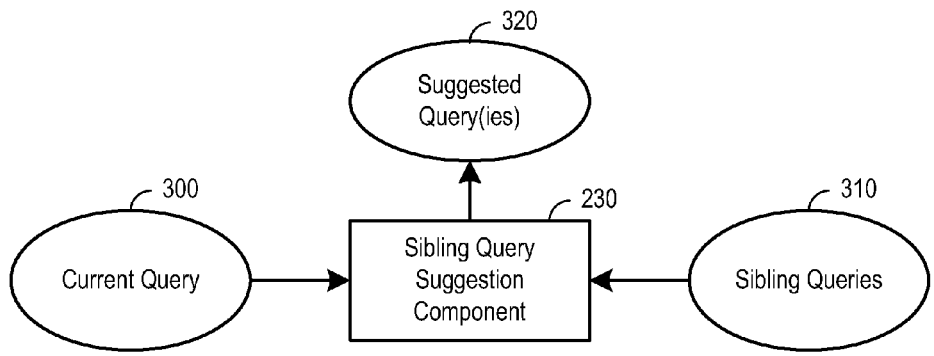
FIG. 3 is a block diagram illustrating an example data flow associated with a sibling query suggestion component.

FIG. 3 is a block diagram illustrating an example data flow associated with a sibling query suggestion component 230. The query suggestion component 230 can receive a current query 300. The current query 300 can be received, for example, from a search engine interface (e.g., search engine interface 120 of FIG. 1).

The query suggestion component 230 can retrieve sibling queries 310. The sibling queries 310 can be retrieved, for example, from a sibling query data store (e.g., sibling query store 220 of FIG. 2A). The query suggestion component 230 can compare the current query 300 to the sibling queries 310 to determine whether the current query 300 has any sibling queries 310.

If the current query 300 has a sibling query 310, the query suggestion component 230 can produce a suggested query (or queries) 320. The suggested query(ies) can include the other queries in a sibling query set associated with the current query 320. In some implementations, the suggested query(ies) 320 can be formatted for inclusion with search results.

Figure 4:
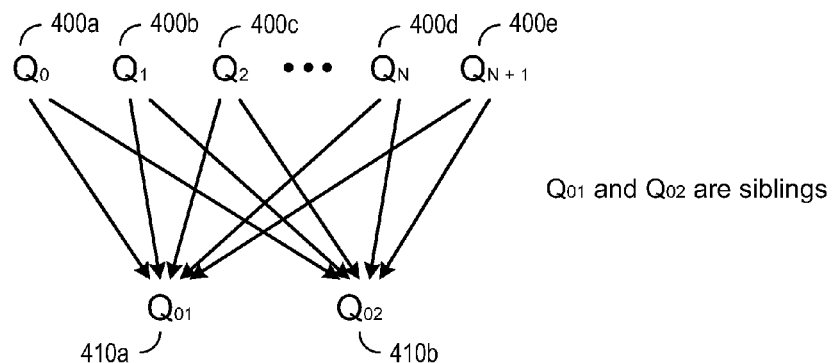
FIGS. 4 and 5 are link diagrams illustrating the relationship between follow-up queries and predicate queries.

FIG. 4 is a link diagram illustrating the relationship between potential sibling queries and associated predicate queries in terms of particular example queries. Queries $Q_{01}$ 410a and $Q_{02}$ 410b are analyzed to determine whether they are sibling queries. Predicate queries associated with queries $Q_{01}$ 410a and $Q_{02}$ 410b are identified. A first predicate query set associated with $Q_{01}$ 410a and a second predicate query set associated with $Q_{02}$ 410b are identified. The intersection of the first predicate query set and the second predicate query set are derived to provide a set comprising the intersecting predicate queries $Q_1$ 400a, $Q_2$ 400b, $Q_3$ 400c, $Q_N$ 400d, $Q_{N+1}$ 400e.

In some implementations, a sibling query identification component can compare the number of intersecting predicate queries 400a-e to a threshold (N). If the number of intersecting predicate queries 400a-e is greater than N, then the associated potential sibling queries are identified as sibling queries. In the example of FIG. 4, the number of intersecting predicate queries 400a-e is N+1 (e.g., as identified by the subscript). Because N+1 is greater than the threshold (N), queries $Q_{01}$ and $Q_{02}$ are identified as sibling queries.

In some examples, a second level of sibling queries can be identified following the identified sibling queries. For example, if Q01 and Q02 have been identified as sibling queries, queries (e.g., Q001, Q002, Q003, Q004) that are entered in the same session immediately following Q01 and Q02 can be analyzed to determine whether those queries are sibling queries. Thus, sets of predicate queries that precede queries Q001, Q002, Q003, Q004 (including Q01 and Q02) can be analyzed to determine the degree to which the respective predicate query sets overlap.

Figure 5:
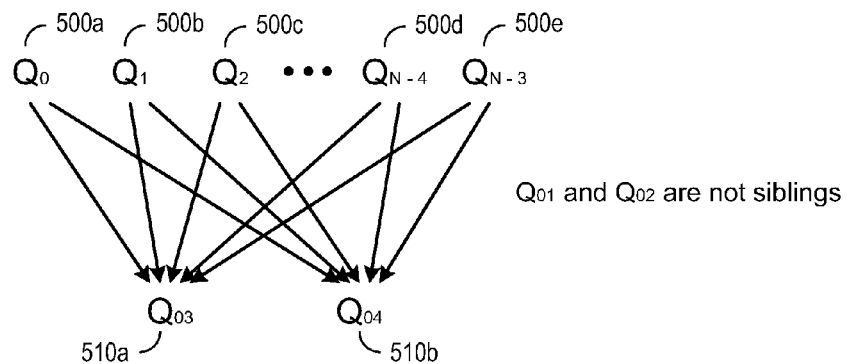

FIG. 5 is a link diagram illustrating the relationship between potential sibling queries and predicate queries in terms of particular example queries. Queries $Q_{03}$ 510a and $Q_{04}$ 510b are analyzed to determine whether they are sibling queries. Predicate queries associated with queries $Q_{03}$ 510a and $Q_{04}$ 510b are identified. A first predicate query set associated with $Q_{03}$ 510a and a second predicate query set associated with Q04 510b are identified. The intersection of the first predicate query set and the second predicate query set is derived to provide a set made up of the intersecting predicate queries $Q_1$ 400a, $Q_2$ 400b, $Q_3$ 400c, $Q_{N-4}$ 500d, $QN_{N-3}$ 500e.

In some implementations, a sibling query identification component can compare the number of intersecting predicate queries 500a-e to a threshold (N). If the number of intersecting predicate queries 500a-e is greater than N, then the associated potential sibling queries are identified as sibling queries. In the example of FIG. 5, the number of intersecting predicate queries 500a-e is N−3 (e.g., as identified by the subscript). Because N−3 is less than the threshold (N), queries $Q_{03}$ and $Q_{04}$ are not identified as sibling queries.

Figure 6:
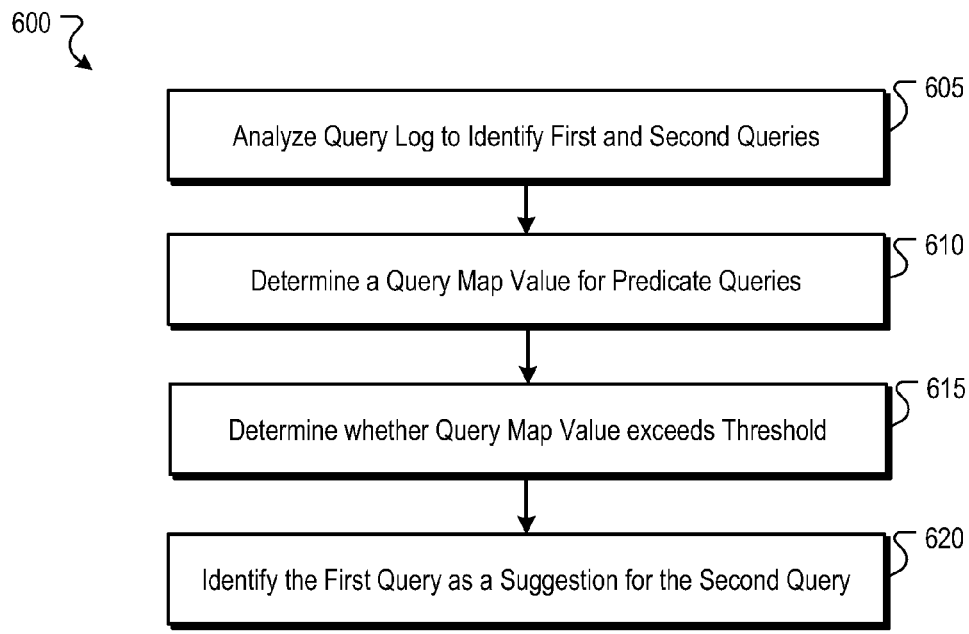
FIG. 6 is a flowchart illustrating an example process for identifying query suggestions.

FIG. 6 is a flowchart illustrating an example process 600 for identifying query suggestions. A query log is analyzed (605) to identify first and second queries. The query log can be analyzed, for example, by a sibling query identification engine (e.g., sibling query identification component 210). The query log can be analyzed to identify queries that share common predicate queries. In some implementations, each query can be analyzed to identify a set of predicate queries. The sets of predicate queries can then be compared to each other to identify queries that have similar sets of predicate queries. In other implementations, sibling queries can be identified based upon their inclusion in a group of queries to be provided as suggestions to a predicate query. Groups of predicate queries associated with each of the potential sibling queries can then be derived.

In still further implementations, each query in the query log can be associated with a set of potential sibling queries (e.g., queries that share at least one common predicate query). In such implementations, the potential sibling queries for a subject query can be identified by deriving a set of predicate queries made up of those queries that immediately precede the subject query in a query log of completed searches. The set of predicate queries can then be analyzed to identify those queries within the respective sessions that immediately follow the each of the queries in the set of predicate queries. The queries that immediately follow the set of predicate queries associated (excluding the subject query) are identified as potential sibling queries. Each of the potential sibling queries can be analyzed to identify sets of predicate queries respectively associated with each of the potential sibling queries.

A query map value for the predicate queries can be determined (605). The query map value can be determined, for example, by a sibling query identification engine (e.g., sibling query identification component 210 of FIG. 2A). In some implementations, the query map value can be a measure of the query quantity (e.g., the total number of members in the set) of the intersection of the predicate query groups associated with the two potential sibling queries. For example, if the total number of members in a set defined by the intersection of a first group of predicate queries and a second group of predicate queries is 10, the query map value can be determined to be 10. In other implementations, the query map value can be a query intersect frequency. The query intersect frequency can define a percentage overlap between the respective predicate query sets associated with two potential sibling queries. For example, if the size of the intersection of two groups of predicate queries is 10, while the size of the union of the same two groups of predicate queries is 15, the query map value (e.g., query intersect frequency) can be determined to be 10/15=0.667.

A determination of whether the query map value exceeds a threshold is made (615). The determination of whether the query map value exceeds the threshold can be made, for example, by a sibling query identification engine (e.g., sibling query identification component 210 of FIG. 2A). In those implementations where the query map value is a measure of the size (e.g., quantity) of the intersection between groups of predicate queries, the threshold can be any positive integer. In those implementations where the query map value is a query intersect frequency between the groups of predicate queries, the threshold can be a fractional or decimal number. In various implementations, the determination of whether the query map value exceeds the threshold can be a determination of whether the query map value is greater than or equal to the threshold.

The first query can be identified (620) as a suggestion for the second query (and/or the second query can be identified as a suggestion for the first query). The first query can be identified as a suggestion for the second query, for example, by a sibling query identification engine (e.g., sibling query identification component 210 of FIG. 2A). Thus, in some implementations, when one of the first or second queries is received, the other of the first or second queries can be provided as a suggestion based upon the received query.

Figure 7:
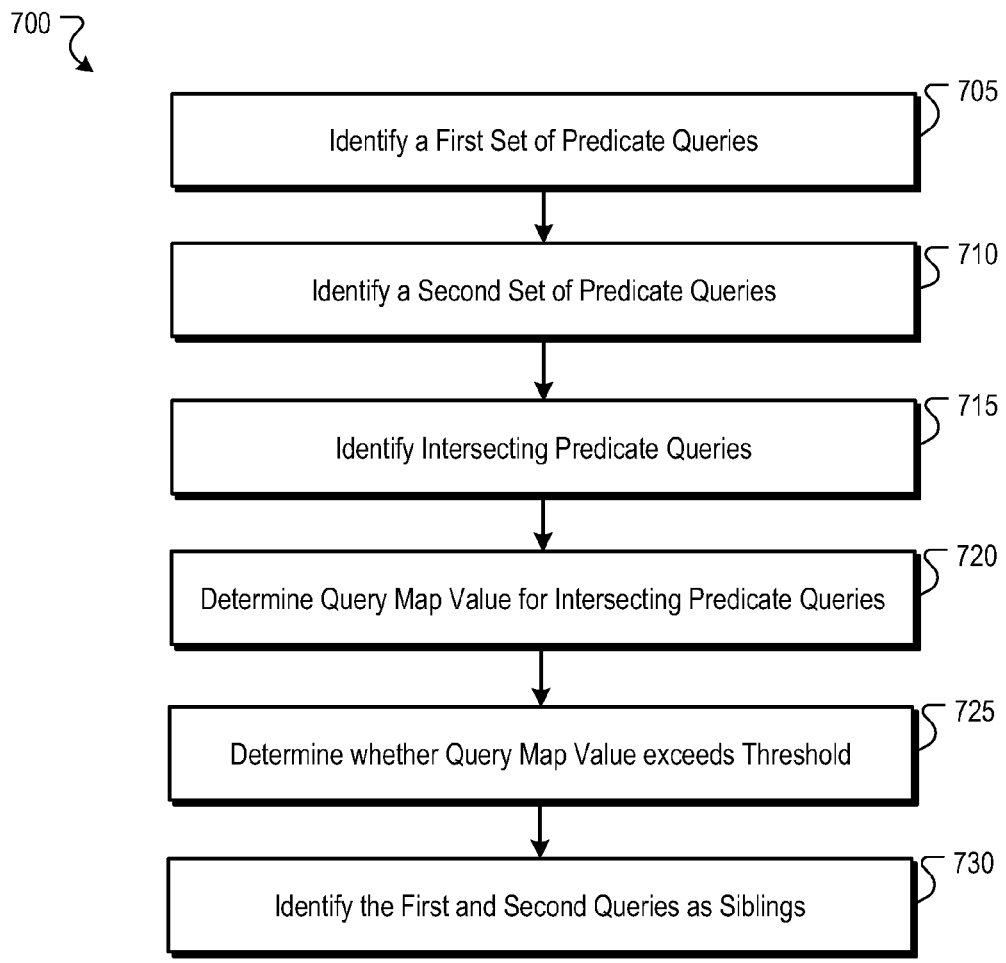
FIG. 7 is a flowchart illustrating another example process for identifying query suggestions.

FIG. 7 is a flowchart illustrating another example process 700 for identifying suggestions. A first group of predicate queries is identified (705). The first set of predicate queries can be identified, for example, by a sibling query identification engine (e.g., sibling query identification component 210 of FIG. 2A) in conjunction with a query log(e.g., query log data store 200 of FIG. 2A). In some implementations, the first set of predicate queries can be identified based upon a first query. The first query can be a search query received from a search engine interface for analysis, or it could be a query retrieved from a query log for analysis, among others. The set of predicate queries associated with the first query can be identified by identifying queries which proceed the first query in search sessions. In some implementations, the set of queries which proceed the first query in search sessions can be reduced by filtering out those queries from the set which do not show a strong association (e.g., based upon the query weight) with the first query. Such queries can be filtered because they are only rarely followed by the first query.

A second group of predicate queries is also identified (710). The second set of predicate queries can be identified, for example, by a sibling query identification engine (e.g., sibling query identification component 210 of FIG. 2A) in conjunction with a query log(e.g., query log data store 200 of FIG. 2A). In some implementations, the second group of predicate queries can be identified based upon a second query. The second query can be identified as a common follow-up query for one of the queries in the first group of predicate queries, or it could be a query retrieved from the query log for analysis, among others. The second group of predicate queries associated with the second query can be identified by identifying queries which proceed the second query in search sessions. In some implementations, the set of queries which proceed the second query in search sessions can be reduced by filtering out those queries from the set which do not show a strong association (e.g., based upon query weight) with the second query.

Intersecting predicate queries are identified (715). The intersecting predicate queries can be identified, for example, by a sibling query identification engine (e.g., sibling query identification component 210 of FIG. 2A). In some implementations, the first group of predicate queries is compared to the second set of predicate queries to identify overlap between the first and second groups. Such overlap is referred to as the intersection of the two groups.

A query map value for the set of intersecting predicate queries is determined (720). The query map value can be determined, for example, by a sibling query identification engine (e.g., sibling query identification component 210 of FIG. 2A). In some implementations, the query map value can be a measure of a query quantity (e.g., the total number of members in the set) of the intersection of the predicate query groups associated with the two potential sibling queries. For example, if the total number of members in a set defined by the intersection of a first group of predicate queries and a second group of predicate queries is 10, the query map value can be determined to be 10. In other implementations, the query map value can be a query intersect frequency. The query intersect frequency can define a percentage overlap between the predicate query groups associated with two potential sibling queries. For example, if the size of the intersection of two groups of predicate queries is 10, while the size of the union of the same two groups of predicate queries is 15, the query map value can be determined to be 10/15=0.667.

A determination of whether the query map value exceeds a threshold is made (725). The determination of whether the query map value exceeds the threshold can be made, for example, by a sibling query identification engine (e.g., sibling query identification component 210 of FIG. 2A). In those implementations where the query map value is a measure of the size of the intersection between groups of predicate queries, the threshold can be any positive integer. In those implementations where the query map value is a query intersect frequency between the groups of predicate queries, the threshold can be a fractional or decimal number. In various implementations, the determination of whether the query map value exceeds the threshold can be a determination of whether the query map value is greater than or equal to the threshold.

The first query and the second query can be identified as siblings (730). The first query and second query can be identified as siblings, for example, by a sibling query identification engine (e.g., sibling query identification component 210 of FIG. 2A). In some implementations, the first and second queries can be identified as sibling queries. Thus, when one of the first or second queries is received, the other of the first or second queries can be provided as a suggestion based upon the received query.

Although in the various implementations described above, the sibling queries are show as derived offline before a current search query is received, in other implementations the sibling queries to a currently received query can be derived while the search engine is retrieving search results, and the sibling queries can be identified from a real-time analysis of the query log data.

Embodiments of the subject matter and the functional operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer program products, i.e., one or more modules of computer program instructions encoded on a tangible program carrier for execution by, or to control the operation of, data processing apparatus. The tangible program carrier can be a propagated signal or a computer readable medium. The propagated signal is an artificially generated signal, e.g., a machine generated electrical, optical, or electromagnetic signal, that is generated to encode information for transmission to suitable receiver apparatus for execution by a computer. The computer readable medium can be a machine readable storage device, a machine readable storage substrate, a memory device, a composition of matter effecting a machine readable propagated signal, or a combination of one or more of them.

The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them.

A computer program (also known as a program, software, software application, script, or code) can be written in any form of programming language, including compiled or interpreted languages, or declarative or procedural languages, and it can be deployed in any form, including as a stand alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, to name just a few.

Computer readable media suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described is this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client server relationship to each other.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Particular embodiments of the subject matter described in this specification have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous.

What is claimed is:

1. A computer-implemented method, comprising:
   identifying a first query and a second query in a query log;
   identifying a set of overlapping predicate queries for the first query and the second query, the set of overlapping predicate queries being a set of predicate queries for the first query that are also predicate queries for the second query;
   identifying, by one or more computers, an intersection set size associated with an intersection set of a first set of predicate queries comprising queries that have immediately preceded the first query in associated sessions and a second set of predicate queries comprising queries that have immediately preceded the second query in associated sessions, the intersection set thereby defining the set of overlapping predicate queries;
   identifying, by one or more computers, a union set size associated with a union set of the first set of predicate queries and the second set of predicate queries; and
   assigning, by one or more computers, a quotient of the intersection set size over the union set size as a query intersect frequency for the first query and the second query;
   determining a query map value for the first query and the second query, the query map value being determined from the set of overlapping predicate queries and comprising the query intersect frequency;
   determining that the query map value exceeds a threshold; and
   in response to determining that the query map value exceeds the threshold, identifying the first query as a query suggestion for the second query and the second query as a query suggestion for the first query.

2. The computer-implemented method of claim 1, further comprising:
   receiving a new search query from a user;
   determining that the new search query matches one of the first query or the second query;

identifying, in response to determining that the query map value exceeds the threshold, the other of the first query and the second query as a suggested search query for the new query; and providing search results associated with the new search query and the suggested search query to the user.

3. The computer-implemented method of claim 1, further comprising:

identifying query weightings associated with each of the predicate queries in the set of overlapping predicate queries, each query weighting defining a rate at which an overlapping predicate query leads to the first query or the second query;

comparing the query weightings to a threshold query weighting;

determining an adjusted group of overlapping predicate queries comprising those overlapping predicate queries whose query weightings exceed the threshold query weighting; and defining the query map value, based at least in part, on a quantity of predicate queries that are included in the adjusted group of overlapping predicate queries.

4. The computer-implemented method of claim 1, wherein: the query map value comprises:

a query quantity identifying a count of a number of queries in the set of overlapping predicate queries; and a query intersect frequency indicative of a percentage of overlap, the percentage of overlap comprising a quotient of the number of queries in the set of overlapping predicate queries relative to the number of queries in a union of all predicate queries associated with the first and second queries; and the threshold comprises a quantity threshold and an intersect frequency threshold.

5. The computer-implemented method of claim 1, further comprising:

identifying query weightings associated with each of the queries in the set of overlapping predicate queries, the query weightings indicating rates at which each overlapping predicate query leads to a first query or a second query;

comparing the query weightings to a threshold query weighting;

compiling an adjusted group of overlapping predicate queries comprising those queries whose query weightings meet the threshold query weighting; and defining a first portion of the query map value based, at least in part, on a quantity of queries included in the adjusted group of overlapping predicate queries.

6. The computer-implemented method of claim 5, wherein the threshold comprises a query quantity threshold and a query intersect frequency threshold.

7. The computer-implemented method of claim 1, wherein the determining if the query map value exceeds a threshold comprises determining that the first and second queries are related based upon the first and second queries being associated with a group of predicate queries having at least a threshold query map value.

8. A computer-implemented method comprising:

identifying a first group of predicate queries that have preceded a first query;

identifying a second group of predicate queries that have preceded a second query;

identifying, by one or more computers, intersecting predicate queries between the first group of predicate queries and the second group of predicate queries, the intersecting predicate queries comprising queries from the first group of predicate queries that have immediately preceded the first query in associated sessions and queries from the second group of predicate queries that have immediately preceded the second query in associated sessions;

identifying, by one or more computers, a union set size associated with a union set of the first group of predicate queries and the second group of predicate queries;

determining, by one or more computers, a query intersect frequency for the first query and the second query, the query intersect frequency being determined based on a quotient of a count of the intersecting predicate queries over the union set size;

determining whether the query intersect frequency exceeds a threshold query intersect frequency; and identifying the first query and second query as suggestions for one another if the query intersect frequency exceeds the threshold query intersect frequency.

9. A system to identify query suggestions, the system comprising:

a data store storing a query log comprising queries received by a search engine; and one or more computers including:

a sibling query identification component that identifies a first group of predicate queries, the first group of predicate queries being search queries that were received immediately preceding receipt of a first query;

identifies a second group of predicate queries, the second group of predicate queries being search queries that were received immediately preceding receipt of a second query;

identifies a group of intersecting predicate queries between the first group of predicate queries and the second group of predicate queries, the group of intersecting predicate queries comprising queries from the first group of predicate queries that have immediately preceded the first query in associated sessions and queries from the second group of predicate queries that have immediately preceded the second query in associated sessions;

identifies an intersection set size associated with the group of intersecting predicate queries and a union set size of a union of the first group of predicate queries with the second group of predicate queries;

determines a query intersect frequency based on a quotient of the intersection set size over the union set size;

derives a query map value associated with the group of intersecting predicate queries, wherein the query map value comprises the query intersect frequency; and identifies the first and second query as sibling queries to one another based upon the query map value exceeding a threshold, and operable to store the sibling queries; and a sibling query suggestion component that receives new search queries;

determines whether the new search queries include sibling queries based upon searching a sibling query data store; and provides a suggested query if the new search query includes a sibling query.

10. The system of claim 9, wherein:

the sibling query identification component further identify identifies query weightings associated with each of the predicate queries in the group of intersecting predicate queries, each query weighting defining a rate at which an overlapping predicate query preceded a first query or a second query; and produces an adjusted group of overlapping predicate queries comprising those intersecting predicate queries whose weighting exceed a threshold query weighting; and the query map value is based, at least in part, on a quantity of predicate queries that are included in the adjusted group of overlapping queries.

11. The system of claim 9, wherein:

the threshold comprises a quantity threshold and an intersect frequency threshold; and the query map value comprises:

a query quantity identifying a count of the predicate queries in the group of overlapping predicate queries; and a query intersect frequency indicative of a percentage of overlap, the percentage of overlap being based, at least in part, on a quotient of the count of the predicate queries in the group of overlapping predicate queries relative to a number of predicate queries that are included in a union of all predicate queries associated with the first and second queries.

12. The system of claim 9, wherein:

the sibling query identification component furthers identifies query weightings associated with each of the queries in the group of intersecting predicate queries, the query weightings defining rates at which the predicate queries in the group of overlapping predicate queries lead to a first query or a second query;

produces an adjusted group of overlapping predicate queries comprising those intersecting predicate queries whose weighting exceed a threshold query weighting;

and the query map value comprises the query intersect frequency and a query quantity, the query quantity defining a quantity of the adjusted group of overlapping queries.

13. The system of claim 12, wherein the threshold comprises a query quantity threshold and a query intersect frequency threshold.

14. The system of claim 9, wherein the sibling query identification component determines that the first and second queries are related based upon the first and second queries being associated with a query map value that exceeds the threshold.

15. A computer program product, stored on a non-transitory machine readable storage device, comprising instructions that when executed by data processing apparatus cause the data processing apparatus to perform operations comprising:

identifying a first group of predicate queries that have preceded a first query;

identifying a second group of predicate queries that have preceded a second query;

identifying an intersection set size associated with an intersection set of the first group of predicate queries and the second group of predicate queries, the intersection set defining a set of overlapping predicate queries;

identifying a union set size associated with a union set of the first group of predicate queries and the second group of predicate queries; and assigning a quotient of the intersection set size over the union set size as a query intersect frequency for the first query and the second query;

deriving a query map value based on the intersect frequency;

determining whether the query map value is greater than a threshold query map value; and identifying the first query and second query as suggestions for one another based upon determining that the query map value is greater than the threshold query map value.

16. The computer program product of claim 15, wherein the query map value comprises a frequency with which one group of predicate queries intersects another group of predicate queries.

17. The computer program product of claim 15, wherein the query map value comprises a count of a number of intersecting predicate queries between the first group of predicate queries and the second group of predicate queries.

* * * * *